US006405176B1

(12) United States Patent
Toohey

(10) Patent No.: US 6,405,176 B1
(45) Date of Patent: Jun. 11, 2002

(54) METHOD FOR PROCESSING MULTIPLE ELECTRONIC SHOPPING CARTS

(75) Inventor: James J. Toohey, Boca Raton, FL (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/238,113

(22) Filed: Jan. 27, 1999

(51) Int. Cl.[7] .............................................. G06F 17/60
(52) U.S. Cl. .......................................... 705/26; 705/27
(58) Field of Search ............................. 705/26, 27, 30, 705/34, 40; 345/5.1, 5.2; 235/380

(56) References Cited

U.S. PATENT DOCUMENTS

| 5,710,887 A | * | 1/1998 | Chelliah et al. | 705/26 |
| 5,745,681 A | * | 4/1998 | Levine et al. | 705/26 |
| 5,895,454 A | * | 4/1999 | Harrington | 705/26 |
| 5,918,213 A | * | 6/1999 | Bernard et al. | 705/26 |
| 6,026,376 A | * | 2/2000 | Kenney | 705/27 |
| 6,029,141 A | * | 2/2000 | Bezos et al. | 705/27 |
| 6,032,130 A | * | 2/2000 | Alloul et al. | 705/27 |
| 6,101,482 A | * | 8/2000 | DiAngelo et al. | 705/26 |
| 6,125,353 A | * | 9/2000 | Yagasaki | 705/27 |
| 6,128,600 A | * | 10/2000 | Imamura et al. | 705/26 |

FOREIGN PATENT DOCUMENTS

| JP | 09167185 A | 6/1997 |
| JP | 10105600 A2 | 4/1998 |
| JP | 11-154176 | 6/1999 |
| WO | WO 00/41520 | 7/2000 |
| WO | WO 00/42548 | 7/2000 |
| WO | WO 00/42550 | 7/2000 |

OTHER PUBLICATIONS

"eShop on computers, television and personal communication devices: e-shop offers first electronic shopping technology that allows merchants to create exciting, personalized shopping experiences for consumers"; Business Editors; Dialog file 610, Accessio Dec. 1993.*
Johnson "shop till you drop on the Web this holiday season"; Computergram International, n2811; Dialog file 647, Accession No. 01111902, Dec. 1996.*

(List continued on next page.)

Primary Examiner—Sam Rimell
Assistant Examiner—Romain Jeanty
(74) Attorney, Agent, or Firm—Akerman Senterfitt

(57) ABSTRACT

A method for processing multiple store-level electronic shopping carts in an E-commerce mall extends the electronic shopping cart concept and increases processing flexibility for mall participants by the creation of an electronic shopping basket for an E-commerce mall that contains within it the virtual ledgers of the E-commerce stores which, in the aggregate, embody the E-commerce mall. A method for processing virtual ledgers in a virtual mall enables implementors to process all virtual ledgers at the mall-level without sacrificing the collection of purchase data for each store-level transaction, typically associated with the processing of the virtual ledger at the store-level. This scheme results from modern business processes, such as monetary transactions and inventory tracking, which are dependent upon the electronic shopping cart paradigm and are triggered upon a store-level checkout. Thus, a particular advantage of the present invention is that electronic commerce shoppers are provided with the convenience of the single payment transaction for all shopping in the virtual mall and the virtual stores can receive data to update respective point of sale systems.

6 Claims, 2 Drawing Sheets

OTHER PUBLICATIONS

"Virtual technology Corporation Announces Ingram, Micro Reseller Agreement"; Business Editors; Dialog file 810, Accession No. 0777357, Nov. 1997.*

"Prodigy Signs up Broadvision to do it a Virtual Shopping Mall on the Internet"; Computergram International, n2811, Dec. 1995.*

Heather "Defense Logistics Agency"; Air Force Times vol. 58 issue 50; p. 12, Dec. 1993.*

David "Open for business: Web storefront creation software"; PC Magazine, v16, n20, p143; Dialog filw 275, Accession No. 02118629, Dec. 1993.*

Elliot; Dialog File 570, Acc# 01541453; SABRE Hits the Net: The CRS' new World Wide Web site offers a complete travel solution for do–it–yourselfers, Travel Agent, p46, Apr. 1996.*

Jim Kerstetter, *Online Mall Thinks Big*, PC Week, v15, n36, p 25(1) (Sep. 1998).

"Online Mall Thinks Big," *PC Week*, vol. 15, No. 36, Sep. 7, 1998.

"Two Merchant Makers Join Web," *Inter@ctive Week*, vol. 5, No. 35, Sep. 14, 1998.

"About BuyItOnline," http://www.BuyItOnline.com/about-buyit.html.

"About Charter Membership," http://www.BuyItOnline.com/charter.html.

* cited by examiner

METHOD FOR PROCESSING MULTIPLE ELECTRONIC SHOPPING CARTS

BACKGROUND OF THE INVENTION

1. Field of the Invention

This invention relates to the field of electronic commerce, and in particular, to a method for processing multiple electronic shopping carts in an electronic commerce mall.

2. Description of the Related Art

The growth and development of on-line shopping sites, often referred to as "E-commerce stores," has resulted in the conception of an electronic shopping cart. Advantages of the electronic shopping cart concept include the provision of an easily recognizable icon which provides to the electronic commerce shopper a familiar metaphor in which to place articles selected for purchase. Moreover, the electronic shopping cart concept allows software engineers who develop on-line shopping sites to treat this element of the shopping experience as an independent object. To date, the single store, on-line shopping experience includes only one electronic shopping cart per shopper. Still, the on-line shopping paradigm has been extended to include the concept of an "E-Commerce Mall", that is, an aggregation of many E-commerce stores.

To assist the electronic commerce shopper in navigating the E-Commerce Mall, software engineers have implemented a universal electronic shopping cart, recognizable by each retailer in the E-Commerce Mall. In other words, when an electronic commerce shopper enters the E-Commerce Mall, the electronic commerce shopper uses a single electronic shopping cart in all E-commerce stores situated in the E-Commerce Mall. As the electronic commerce shopper tours each E-commerce store, the electronic commerce shopper can place store items selected for purchase in the universal electronic shopping cart. At the conclusion of the electronic commerce shopper's shopping experience, the mall operator can check-out each store item in the electronic commerce shopper's universal electronic shopping cart. Subsequently, the E-Commerce Mall operator must reconcile the transaction with each E-commerce Store from whom the electronic commerce shopper has purchased store items.

The E-Commerce Mall concept represents a business proposition between each E-commerce store and the E-Commerce Mall operator. For example, E-commerce store tenants likely pay "rent" to the E-Commerce Mall operator. Still, certain components of the business process resist centralization and remain localized among each E-commerce store, for instance inventory, fulfillment, and billing. The universal shopping cart paradigm ignores this reality, requiring the E-Commerce Mall operator to manage fulfillment and billing. Moreover, inventory, fulfillment, billing and related processes are triggered by the E-commerce store checkout event and not the E-Commerce Mall checkout event.

Practicalities of the market place impose limitations upon how, when and in what order financial settlements and business processes occur. Thus, while the concept of a universal electronic shopping cart used throughout an E-Commerce Mall may facilitate the electronic commerce shopper's E-Commerce shopping experience, the universal electronic shopping cart concept increases the burden upon both the mall operator and each E-Commerce Store.

There is a long-felt need to reconcile the conflicting requirements of the electronic commerce shoppers, the E-Commerce Stores and the E-Commerce Mall operator.

SUMMARY OF THE INVENTION

The long-felt need to reconcile the conflicting requirements of electronic commerce shoppers, the E-Commerce Stores and the E-Commerce Mall operator is met in accordance with the inventive arrangement. In accordance with the inventive arrangements multiple store-level electronic shopping carts ["virtual ledgers"] are processed in an E-commerce mall ["mall"]. The concept of the electronic shopping cart is extended to increase processing flexibility for mall participants ["electronic commerce shoppers"] by the creation of an electronic shopping basket for a mall that can contain within it virtual ledgers respectively associated with all stores in the mall. The subject invention enables implementors to process all virtual ledgers at the mall-level without sacrificing the collection of purchase data for each store-level transaction, typically associated with the processing of the virtual ledger at the store-level. This scheme is consistent with modern business processes, such as monetary transactions and inventory tracking, which are dependent upon the electronic shopping cart paradigm and are triggered upon a store-level checkout. Thus, a particular advantage of the present invention is that electronic commerce shoppers are provided with the convenience of the single payment transaction for all shopping in the virtual mall, and at the same time, the virtual stores can receive data to update respective point of sale systems.

A method for managing electronic commerce in a virtual mall having a plurality of virtual stores which can be accessed by electronic commerce shoppers, comprises the steps of: assigning to each electronic commerce shopper an electronic shopping basket; placing each electronic commerce shopper into at least one of the virtual stores; collecting purchase data for each store item selected for purchase by each electronic commerce shopper; processing payment for all store items selected for purchase by each electronic commerce shopper in a single transaction; and, supplying the purchase data collected for each store item selected for purchase by each electronic commerce shopper to the respective virtual store with which the store items are associated.

The collecting step further includes assigning to each electronic commerce shopper a virtual ledger for each virtual store visited by the electronic commerce shopper; storing in each of the virtual ledgers purchase data for all store items selected for purchase in one virtual store by one electronic commerce shopper; and, associating all of the virtual ledgers in which each electronic commerce shopper selects at least one article for purchase with each electronic commerce shopper's electronic shopping basket in a manner transparent to each electronic commerce shopper.

A computer-based data processing system for managing electronic commerce in a virtual mall having a plurality of virtual stores which can be accessed by electronic commerce shoppers, each virtual store having at least one store item, includes: a plurality of electronic shopping baskets, each electronic shopping basket corresponding to a single electronic commerce shopper; a plurality of virtual ledgers for each virtual store visited by each electronic commerce shopper, each virtual ledger having purchase data for the store items selected for purchase in one virtual store by one electronic commerce shopper; and a first means for associating all of the virtual ledgers in which each electronic commerce shopper has selected at least one store item for purchase with each electronic commerce shopper's corresponding electronic shopping basket in a manner transparent to each electronic commerce shopper.

The computer-based data processing system can further include a second means for processing payment for all store items contained in all virtual ledgers associated with a single one of the electronic shopping baskets in a single transaction. Furthermore, the computer-based data processing system can include a third means for supplying the purchase data for all store items contained in all virtual ledgers associated with a single one of the electronic shopping baskets in a single transaction to each respective virtual store with which the virtual ledgers are associated.

DETAILED DESCRIPTION OF THE PREFERRED EMBODIMENTS

Figure 1:
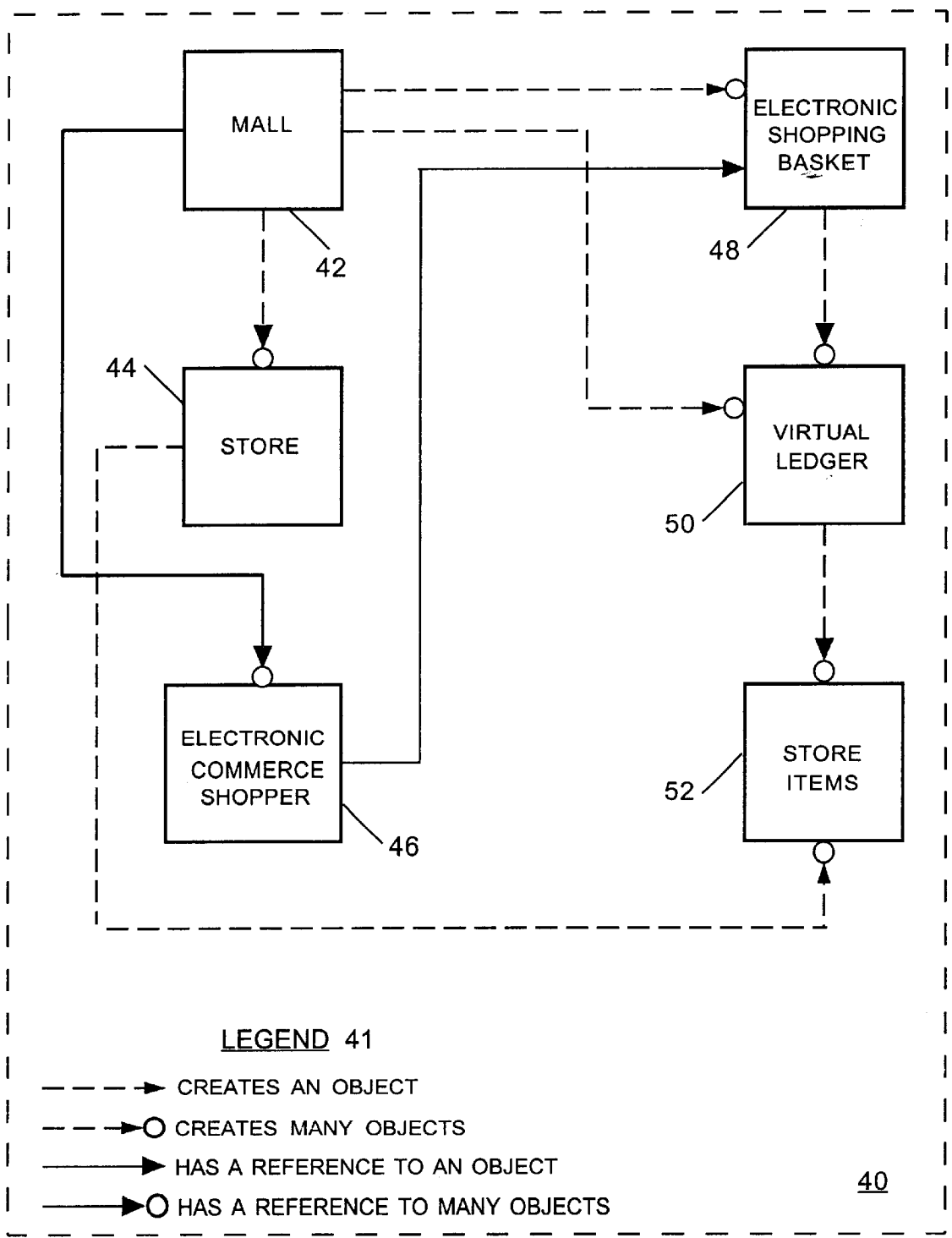
FIG. 1 is an object relationship diagram useful for explaining the inventive method.

The presently preferred embodiment of the inventive method is shown in the drawings, it being understood, however, the inventive methods are not limited to the precise method shown.

FIG. 1 is an object diagram 40, having a legend 41, useful for illustrating the relationships between each object involved in the preferred method. Preferably, at all times, mall 42 has a reference to each store 44 in the mall 42 and to each electronic commerce shopper 46 visiting each store 44 in the mall 42. The mall 42 preferably maintains responsibility for creating (and discarding) each electronic shopping basket 48 as required when a new electronic commerce shopper 46 enters the mall 42. Likewise, the mall 42 preferably is responsible for creating (and discarding) each virtual ledger 50 as required when an electronic commerce shopper 46 enters a store 44.

Each store 44 preferably carries the responsibility of creating store items 52 to be selected for purchase by the electronic commerce shopper 46. Upon selection, the electronic commerce shopper 46 preferably can place each store item 52 into the electronic shopping basket 48. Similarly, the electronic shopping basket 48 preferably can record purchase data concerning the selected store item 52 into the current virtual ledger 50. Notably, through the association of the mall 42 with the electronic shopping basket 48, the mall 42 preferably can obtain a reference to each virtual ledger 50 containing store items 52.

Figure 2:
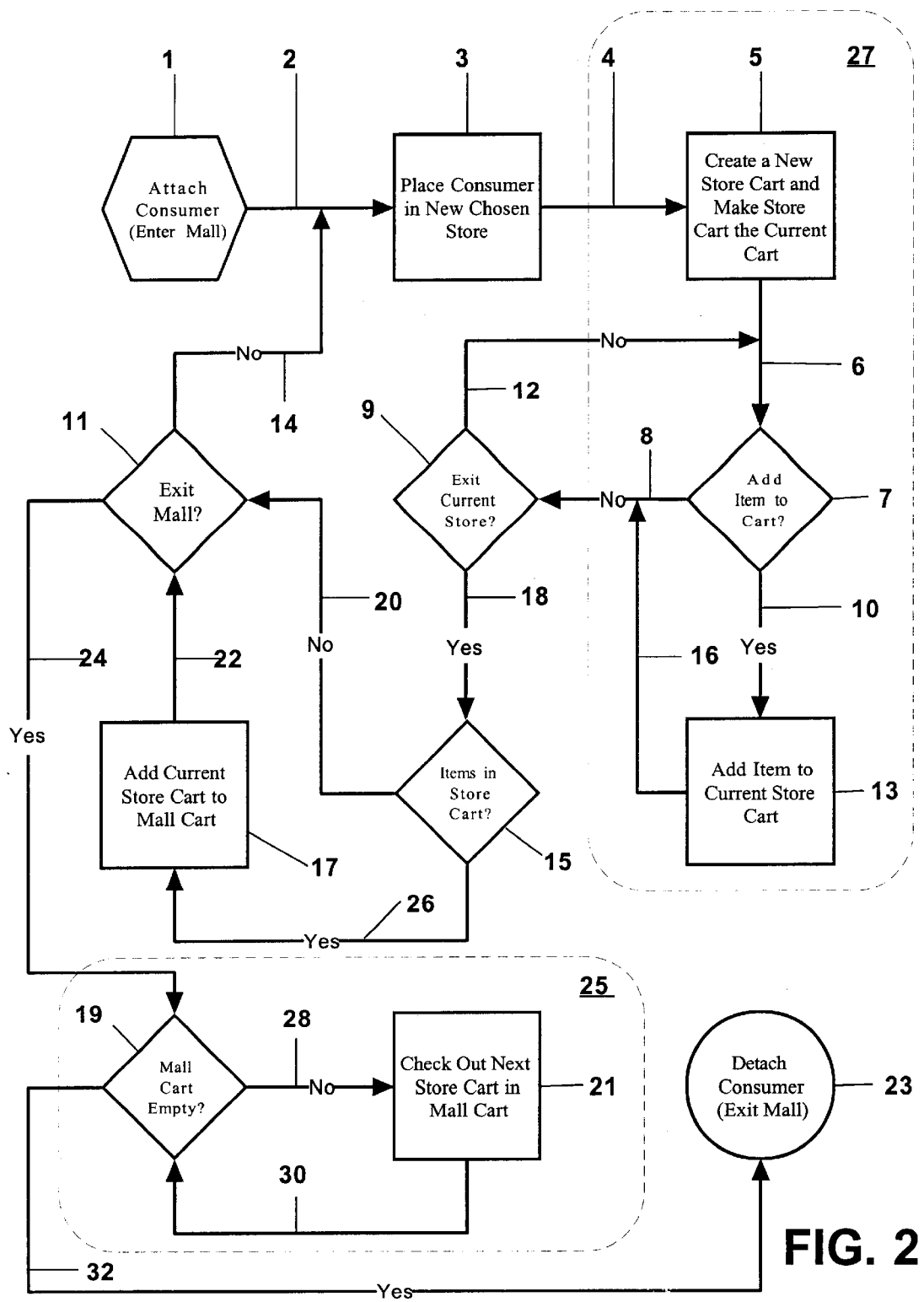
FIG. 2 is a flow-chart of the inventive method which illustrates the flow of program control.

FIG. 2 illustrates the flow of program control in the preferred embodiment. From the mall perspective, as opposed to the electronic commerce shopper perspective, preferably the mall initially attaches the electronic commerce shopper to an electronic shopping basket as the electronic commerce shopper enters the mall as shown in block 1. Continuing along the path 2 to block 3, the electronic commerce shopper preferably selects a store to visit.

Upon selection, continuing along the path 4 to the aggregate step 27, the customer can visit the selected store. Specifically, in visiting the store as in the aggregate step 27, the mall preferably will create a new virtual ledger in the electronic shopping basket and will designate the virtual ledger to be the current virtual ledger as in block 5. Continuing along path 6, if the electronic commerce shopper chooses to add store items to the virtual ledger as in the decision block 7, then continuing along path 10, the store preferably will add store items to the current virtual ledger in step 13.

Subsequent to the adding step of block 13 and continuing along path 16, the electronic commerce shopper preferably can choose to exit the current store in decision block 9. Likewise, the electronic commerce shopper preferably can continue to visit the current store returning to the aggregate step 27, in particular, along the path 12 leading to block 7. If the electronic commerce shopper chooses to exit the current store in decision block 9, then continuing along path 18 to block 15, the store preferably can check the current virtual ledger for added store items. If there are no store items in the current virtual ledger, then continuing along the path 26 to block 17, the current store preferably can discard the current virtual ledger.

In decision block 11, the electronic commerce shopper preferably can choose whether to remain in the mall, or whether to exit the mall. If the electronic commerce shopper chooses to remain in the mall, following along path 14 to the block 3, the electronic commerce shopper preferably can choose a new store to visit. Otherwise, having chosen to exit the mall in the decision block 11, and following along the path 24, the electronic commerce shopper preferably will undergo a single mall checkout event as shown in the aggregate step 25.

Specifically, if the electronic shopping basket is empty as determined by the mall in the decision block 19, then the mall, following along the path 32 to the termination block 23, preferably can detach the electronic commerce shopper, thereby effectively allowing the electronic commerce shopper to exit the mall. However, if the mall detects the presence of virtual ledgers in the electronic shopping basket in the decision block 19, then continuing along the path 28 to the block 21, the mall preferably can process the transaction with respect to the store items contained only in the current virtual ledger. Having processed all store items in the current virtual ledger, continuing along the path 30 to the block 19, the mall preferably can discard the current virtual ledger causing the next virtual ledger, if any, to become the current virtual ledger. The process preferably will continue until no virtual ledgers remain in the electronic shopping basket.

What is claimed is:

1. A method for managing electronic commerce in a virtual mall having a plurality of virtual stores which can be accessed by electronic commerce shoppers, comprising the steps of:

assigning to each said electronic commerce shopper an electronic shopping basket for use while shopping selected virtual stores in said virtual mall;

placing each said electronic commerce shopper into at least one of said virtual stores within said virtual mall;

collecting purchase data for each store item selected for purchase by each said electronic commerce shopper while each said electronic commerce shopper shops in individual virtual stores in said virtual mall, said collected purchase data including information associating each said virtual store item with said individual virtual store in said virtual mall from which said item was selected for purchase;

processing payment in said virtual mall for all said store items selected for purchase in said individual virtual stores by each said electronic commerce shopper in a single transaction; and, supplying said purchase data collected for each said store item selected for purchase by each said electronic commerce shopper to said respective individual virtual stores in said virtual mall from which said associated store items were selected for purchase, whereby said electronic commerce shoppers are provided with the convenience of said single payment transaction for all shopping in said virtual mall and said virtual stores can receive purchase data to update respective point of sale systems.

2. A method according to claim 1, wherein said collecting step further comprises:

assigning to each said electronic commerce shopper a virtual ledger for each said virtual store visited by said electronic commerce shopper;

storing in each of said virtual ledgers purchase data for all store items selected for purchase in one virtual store by one electronic commerce shopper; and, associating all of said virtual ledgers in which each said electronic commerce shopper selects at least one article for purchase with each said electronic commerce shopper's electronic shopping basket in a manner transparent to each said electronic commerce shopper.

3. A method for managing electronic commerce in a virtual mall having a plurality of virtual stores which can be accessed by electronic commerce shoppers, comprising the steps of:

assigning to each said electronic commerce shopper an electronic shopping basket into which virtual ledgers having purchase data can be placed while each said electronic commerce shopper shops in the virtual mall;

assigning to each said electronic commerce shopper a virtual ledger for each said virtual store within the virtual mall visited by said electronic commerce shopper;

storing in each of said virtual ledgers purchase data for all store items selected for purchase in one virtual store in the virtual mall by one electronic shopper, including information associating each said virtual store item with the said virtual store in the virtual mall from which said item was selected for purchase;

associating all of said virtual ledgers in which each said electronic commerce shopper selects at least one store item for purchase with each said electronic commerce shopper's electronic shopping basket in a manner transparent to each said electronic commerce shopper;

processing payment in the virtual mall for all said store items associated with a single one of said electronic shopping baskets in a single transaction; and, supplying said purchase data for all said store items associated with said single payment transaction from said virtual ledgers associated with said electronic shopping basket to each said respective virtual store in the virtual mall with which said virtual ledgers are associated, whereby said electronic commerce shoppers are provided with the convenience of said single payment transaction for all shopping in said virtual mall and said virtual stores can receive purchase data to update respective point of sale systems.

4. A computer-based data processing system for managing electronic commerce in a virtual mall having a plurality of virtual stores within which electronic commerce shoppers have been placed, each said virtual store having at least one store item, comprising:

a plurality of electronic shopping baskets, each said electronic shopping basket corresponding to a single electronic commerce shopper;

a plurality of virtual ledgers for each said virtual store in said virtual mall visited by each said electronic commerce shopper, each said virtual ledger having purchase data for said store items selected for purchase in one virtual store in said virtual mall by one electronic commerce shopper;

first means for associating all of said virtual ledgers in which each said electronic commerce shopper has selected at least one store item for purchase with each said electronic commerce shopper's corresponding electronic shopping basket in a manner transparent to each said electronic commerce shopper; and, second means for transmitting each virtual ledger to an associated virtual store in said virtual mall, whereby each said associated virtual store in said virtual mall can update respective point of sale systems with said purchase data.

5. A computer-based data processing system according to claim 4 further comprising third means for processing payment for all said store items contained in all said virtual ledgers associated with a single one of said electronic shopping baskets in a single transaction.

6. A computer-based data processing system according to claim 4 further comprising fourth means for supplying said purchase data for all said store items contained in all said virtual ledgers associated with a single one of said electronic shopping baskets in a single transaction to each said respective virtual store with which said virtual ledgers are associated.

* * * * *